United States Patent
Park

(10) Patent No.: US 7,168,669 B2
(45) Date of Patent: Jan. 30, 2007

(54) BEVERAGE CONTAINER HOLDER FOR VEHICLE

(75) Inventor: Woo-Chul Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 381 days.

(21) Appl. No.: 10/749,225

(22) Filed: Dec. 30, 2003

(65) Prior Publication Data

US 2005/0072889 A1 Apr. 7, 2005

(30) Foreign Application Priority Data

Oct. 2, 2003 (KR) .................. 10-2003-0068721

(51) Int. Cl.
*B60N 3/10* (2006.01)

(52) U.S. Cl. .............. 248/311.2; 224/539; 248/316.1

(58) Field of Classification Search ............ 248/311.2, 248/683, 689, 229.12, 309.1, 313, 316.1, 248/316.4; 74/110; 220/23.8; 224/539, 224/552, 926

See application file for complete search history.

(56) References Cited

U.S. PATENT DOCUMENTS

| 4,943,111 A * | 7/1990 | VanderLaan ............ 297/188.17 |
| 5,018,633 A * | 5/1991 | Toth et al. ................ 248/311.2 |
| 5,149,032 A * | 9/1992 | Jones et al. ................ 248/154 |
| 5,280,870 A * | 1/1994 | Chick et al. ............... 248/311.2 |
| 5,457,745 A * | 10/1995 | Wang ....................... 379/454 |
| 5,671,877 A * | 9/1997 | Yabuya ..................... 224/282 |
| 5,692,658 A * | 12/1997 | Fischer et al. ............... 224/281 |
| 5,718,405 A * | 2/1998 | Adachi ..................... 248/311.2 |
| 5,897,089 A * | 4/1999 | Lancaster et al. ......... 248/311.2 |
| 5,944,240 A * | 8/1999 | Honma ..................... 224/281 |
| 6,039,296 A | 3/2000 | Nishina et al. |
| 6,206,260 B1 * | 3/2001 | Covell et al. ............... 224/539 |
| 6,755,382 B1 * | 6/2004 | Melnick ................... 248/316.8 |

FOREIGN PATENT DOCUMENTS

| DE | 38 87 453 T2 | 9/1994 |
| DE | 202 04 623 U1 | 10/2002 |
| JP | 1987-177639 | 11/1987 |
| JP | 08244513 A * | 9/1996 |
| JP | 2000-052837 | 2/2000 |
| JP | 2001105952 A * | 4/2001 |
| JP | 2001158300 A | 6/2001 |

* cited by examiner

Primary Examiner—Anita M. King
(74) Attorney, Agent, or Firm—Morgan Lewis & Bockius LLP

(57) ABSTRACT

A beverage container holder for a vehicle includes a housing defining a space for storing a beverage container and at least one slidable container supporter. The housing further defines a horizontal direction, and the at least one slidable beverage container supporter has a first end and a second end for securing the beverage container in the housing. The beverage container may further include a guiding mechanism for guiding the slidable beverage container supporter to move within the housing, and a fixing mechanism for fixing the slidable beverage container supporter in a desired place with respect to the housing.

6 Claims, 3 Drawing Sheets

BEVERAGE CONTAINER HOLDER FOR VEHICLE

CROSS-REFERENCE TO RELATED APPLICATIONS

This application claims priority to Korean Application No. 10-2003-0068721, filed on Oct. 2, 2003, the disclosure of which is incorporated fully herein by reference thereto.

FIELD OF THE INVENTION

The present invention relates to a beverage container holder for a vehicle and, more particularly, to a beverage container holder adapted to stably hold beverage containers of various shapes such as a can, bottle, cup and the like.

BACKGROUND OF THE INVENTION

Modern vehicles are designed with holders configured to support beverage containers. Beverage container holders are generally placed in a crash pad, console, prescribed area of a vehicle, or the like to minimize spillage of drinks under shaky driving conditions. Generally, the beverage container holders have a capacity with a preset size.

However, there is a drawback in a conventional beverage container holder in that its construction is not suitable for holding various shapes and sizes of containers; in particular where the predetermined periphery of the holder is larger than that of the beverage container so as to create a gap. The presence of a gap between the holder and the beverage container may generate noise while the vehicle is in motion. In addition the contents of the container may be spilled due to the shaky movement of the vehicle.

SUMMARY OF THE INVENTION

Embodiments of the present invention provide a beverage container holder for a vehicle constructed in a simple and convenient fashion and configured to stably fix containers with different diameters, for example, a drinking can, bottle, cup or the like.

In a preferred embodiment of the present invention, a beverage container holder for a vehicle comprises a housing defining a space for storing a beverage container and at least one slidable beverage container supporter. The housing may further define a horizontal direction, and the at least one slidable beverage container supporter may have a first end and a second end for securing the beverage container in the housing. The beverage container holder may further include a guiding means for guiding the slidable beverage container supporter to move within said housing and a fixing means for fixing the slidable beverage container supporter in a desired place with respect to the housing.

In a preferred embodiment, the guiding means may include at least one guiding rail having a central portion. The guiding means may be formed inside the housing substantially along the horizontal direction. The guiding means may further include at least one protruding part formed at each of said first and second ends of said slidable beverage container supporter. The at least one protruding part may be insertable in the at least one guide rail for movement of the slidable beverage container supporter along the guiding rail.

The fixing means may preferably include a plurality of fixing holes formed in the housing along a longitudinal direction of the central portion of the guiding rail. In addition, at least one push knob may be operably associated with the slidable beverage container supporter, the at least one push knob having a first position relative to the supporter. Moreover, a first locking member operably associated with the slidable beverage container supporter may have a motion having a direction into or released from the fixing holes in response to the operation of the push knob. A second locking member interacting with said first locking member and operably associated with said slidable beverage container supporter may have a motion into or released from the fixing holes. The fixing means may further include a power transmitting means for transmitting the motion of the first locking member to the second locking member. The power transmitting means may include a rotating gear that meshes with the first and second locking members for moving the second locking member such that the direction of motion of the second locking member is opposite the direction of motion of the first locking member.

The beverage container holder may further comprise a first resilient member for restoring the push knob to the first position, a second resilient member for providing an elastic force to the first locking member to bias or insert the first locking member into at least one of the plurality of fixing holes, and a third resilient member for providing an elastic force to the second locking member to bias or insert the second locking member into at least one of the plurality of fixing holes.

BRIEF DESCRIPTION OF THE DRAWINGS

For a better understanding of the nature and objects of the present invention, reference should be made to the following detailed description with the accompanying drawings, in which:

FIG. 4b is a plan view of the beverage container holder in FIG. 4a.

DETAILED DESCRIPTION OF THE PREFERRED EMBODIMENTS

The preferred embodiment of the present invention will now be described in detail with reference to the attached drawings.

Figure 1:
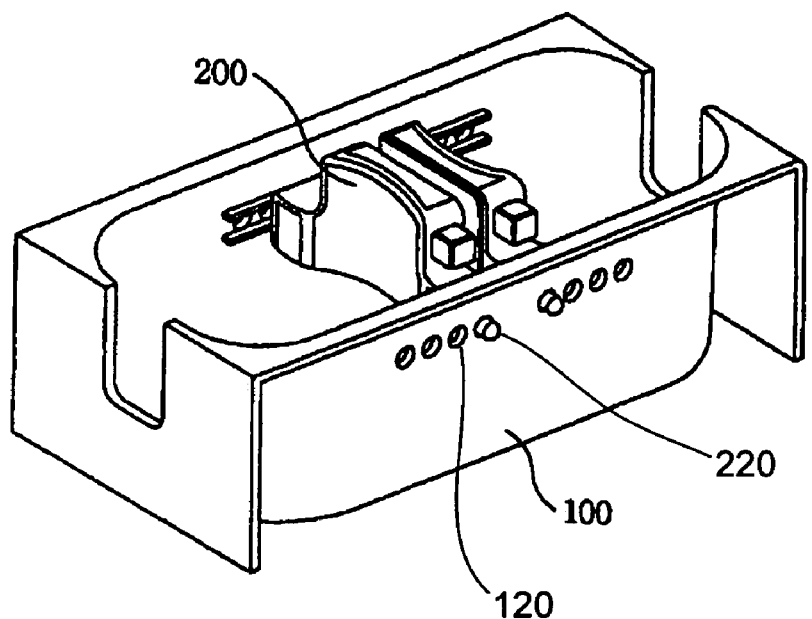
FIG. 1 is a perspective view of a beverage container holder for a vehicle according to an embodiment of the present invention.
Figure 2:
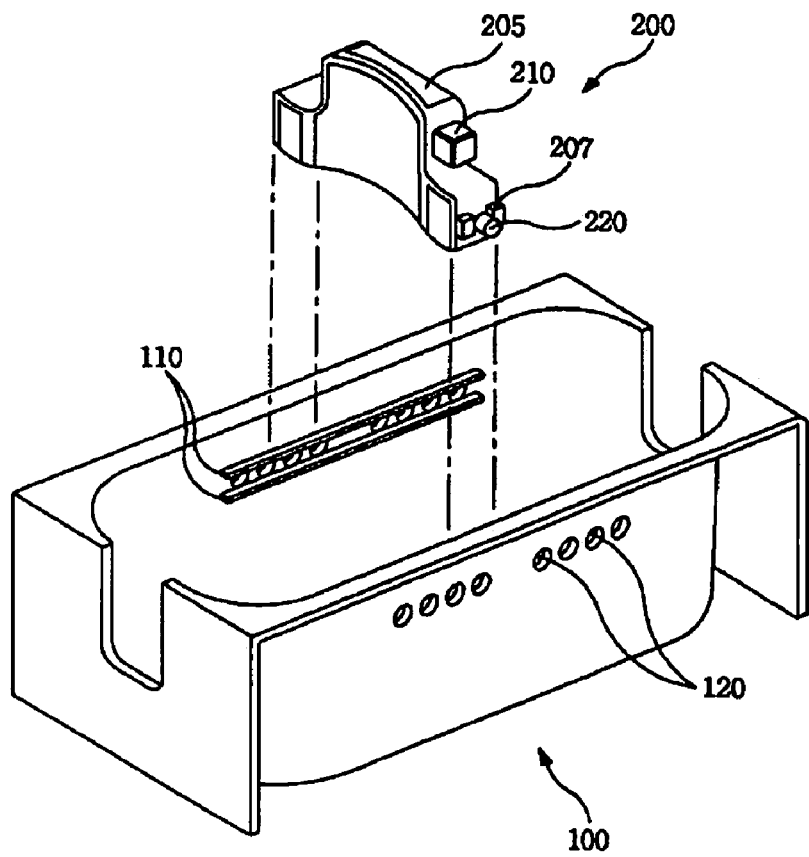
FIG. 2 is an exploded perspective view of the beverage container holder of FIG. 1.

Shown in FIGS. 1 and 2, is an illustrative embodiment of a beverage container holder according to the present invention comprising a housing 100 providing a storage space for a drinking can, drinking bottle, mug or the like. A slidable beverage container supporter 200 may be randomly located inside the housing 100 for sliding along a horizontal or longitudinal direction thereof.

The housing 100 is preferably formed with a guiding rail 110 along the interior of the housing in the horizontal direction. A plurality of fixing holes 120 are formed in the housing 100 preferably in the longitudinal direction along the central portion of the guiding rail 110. The slidable beverage container supporter 200 may include or be formed at one side with a push knob 210. The slidable beverage container supporter 200 may further include a first locking member 220 and a second locking member (not shown). The first locking member 220 and the second locking member may be preferably configured so as to protrude at both sides of the supporter 200 respectively. As shown in FIG. 1, the first locking member 220 and the second locking member may be engaged with and inserted into one of the plurality of fixing holes 120, thereby fixing supporter 200 relative to the housing 100. As will be explained in greater detail below, the push knob 210 may be configured so that upon being manually depressed, the first locking member 220 and the second locking member slide into the slidable beverage container supporter 200. When the locking members are released from the fixing holes 120, the slidable beverage container supporter 200 may slide within the housing 100. After the slidable beverage container supporter 200 has moved to a desired position, the user can release the push knob 210 for allowing the first locking member 220 and the second locking member to be re-inserted into the fixing holes formed in the housing 100, thereby fastening the slidable beverage container supporter 200 to the housing 100.

Protruding parts 207 may be included or formed at both sides of the slidable beverage container supporter 200. Protruding parts 207 may be inserted into the guiding rail 110 in order to limit the movement of the slidable beverage container supporter 200 to the horizontal direction along the guiding rail 110. As long as the protruding parts 207 are inserted into the guiding rail 110, the slidable beverage container supporter 200 may be limited to move only within the guiding rail 110 in a horizontal direction. Guiding rail 110 may be preferably configured so as to have a terminating or distal end. Once the slidable beverage container supporter 200 moves to the distal end of the guiding rail 110, the protruding parts 207 may be separated from the guiding rail 110, and thus, the slidable beverage container supporter 200 may be separated from the housing 100. When the slidable beverage container supporter 200 is completely separated from the housing 100 as described above, the housing 100 may also be used as another storage instead of a drinking container.

Figure 3A:
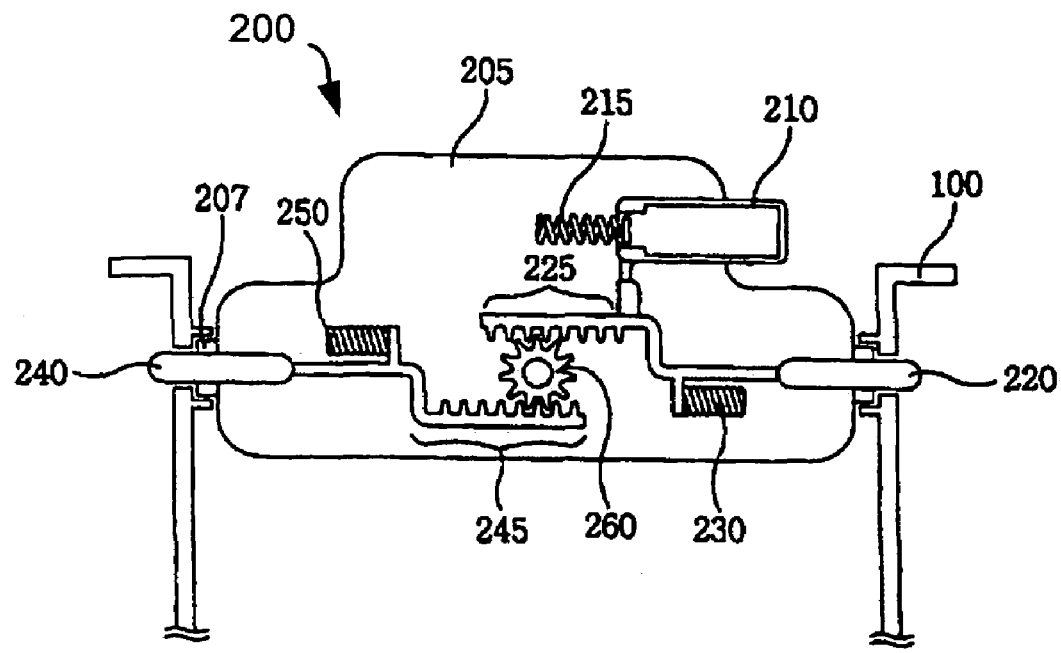
FIG. 3a is a cross-sectional view of a slidable beverage container supporter in a fixed state according to an embodiment of the present invention.
Figure 3B:
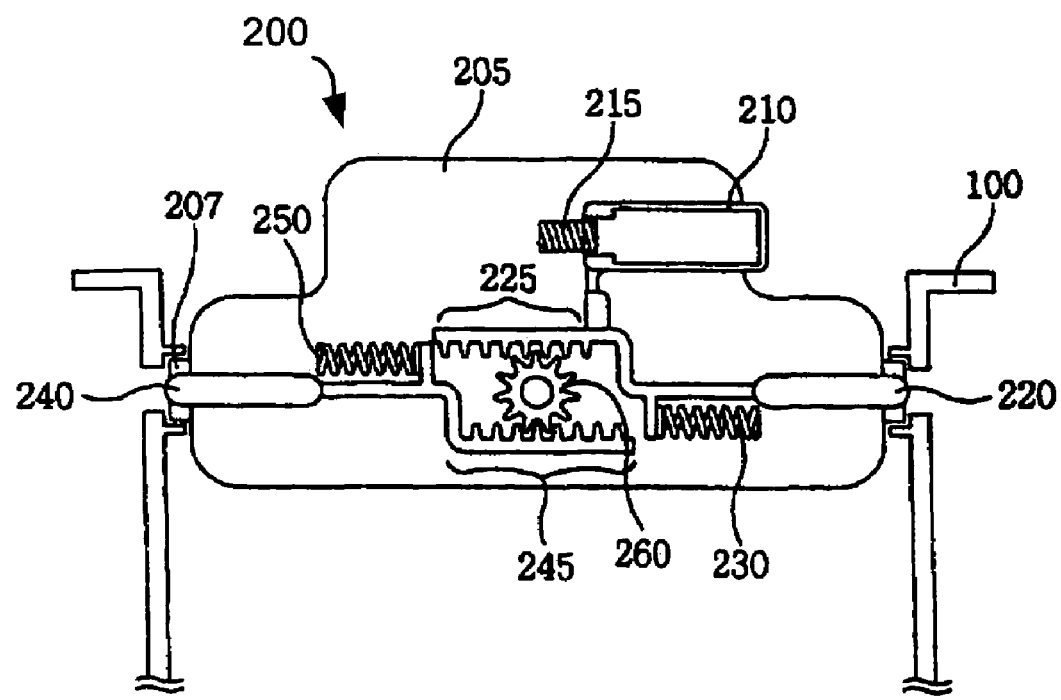
FIG. 3b is a cross-sectional view of the slidable beverage container supporter of FIG. 3a in a slidable state.

FIGS. 3a and 3b illustrate the structure of the slidable beverage container supporter 200 according to a preferred embodiment of the present invention. When the supporter 200 is engaged with the guiding rail 110 and the push knob 210 is not depressed, the slidable beverage container supporter 200 remains in a state in which the beverage container supporter 200 may be fixed relative to the housing 100. FIG. 3b, wherein the push knob 210 is depressed, illustrates a slidable state in which beverage container supporter 200 may slide relative to the housing 100.

As shown in FIGS. 3a and 3b, the push knob 210 may be connected to the first locking member 220. The first locking member 220 may include or be formed with a first horizontal gear portion 225 extended into a supporter body 205. The first horizontal gear portion 225 may engage the upper portion of a rotating gear 260. Rotating gear 260 may be preferably rotatively coupled to a central portion of the supporter body 205. The second locking member 240 may include or be formed with a second horizontal gear portion 245 extended into the supporter body 205. The bottom of the rotating gear 260 may be engaged with the second horizontal gear portion 245 extended from the second locking member 240. Thus, when push knob 210 is depressed, the push knob 210 slides into the supporter body 205, and the first locking member 220 being preferably connected to the push knob 210 may also move inward of the supporter body 205. The rotating gear 260, being engaged with the first locking member 220, starts to turn accordingly, in a counter-clockwise direction. The second locking member 240 in turn moves inward of the supporter body 205 according to the rotation of the rotating gear 260.

The push knob 210, first locking member 220, and second locking member 240 may be coupled to each resilient members 215, 230, and 250 respectively. The resilient members 215, 230, and 250 provide resilient forces against each of push knob 210, first locking member 220, and second locking member 240 respectively in a pushing or biased direction towards the external sides of body 205.

As shown in FIG. 3b, when the push knob 210 is pressed, the first and second locking members 220 and 240 move away from the fixing holes 120, so that the beverage container supporter can slide within the housing 100.

Provided that the push knob 210 is released and no longer being pressed, the push knob 210, first locking member 220, and second locking member 240 restore to their original dispositions as illustrated in FIG. 3a by elastic forces of the resilient members 215, 230, and 250. The resilient member 215 restoring the push knob 210 may preferably be a compression spring, and resilient members 230, 250 restoring the locking members 220, 240 may preferably be extension springs.

Figure 4A:
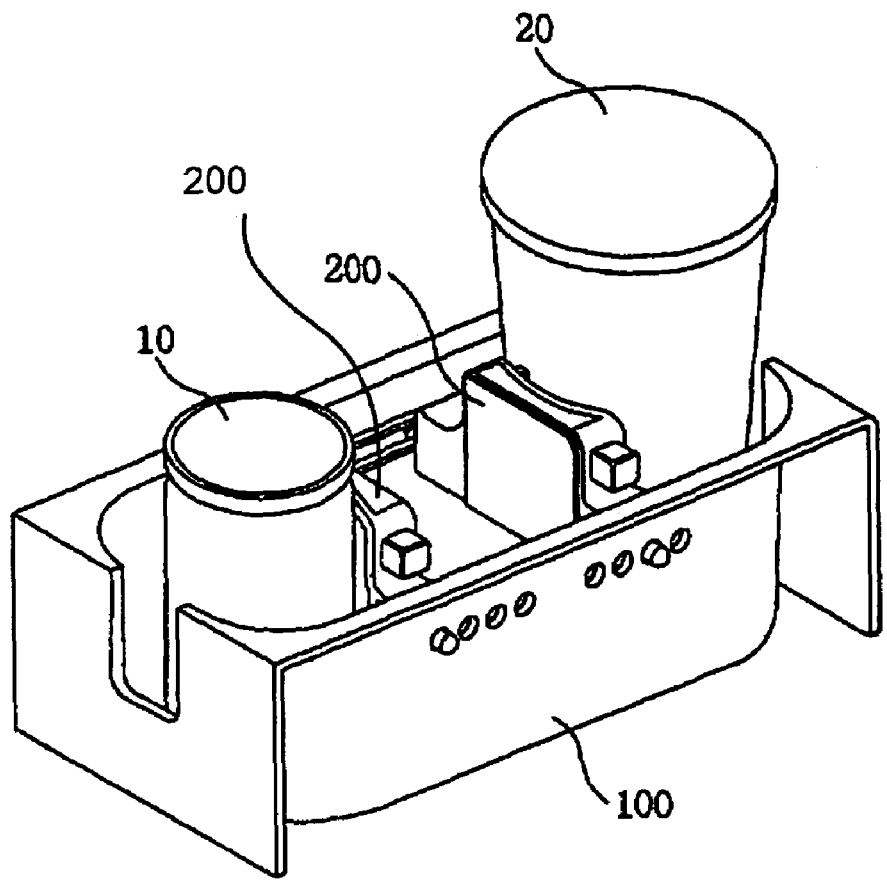
FIG. 4a is a perspective view of the beverage container holder of FIG. 1 holding containers of different diameters.
Figure 4B:
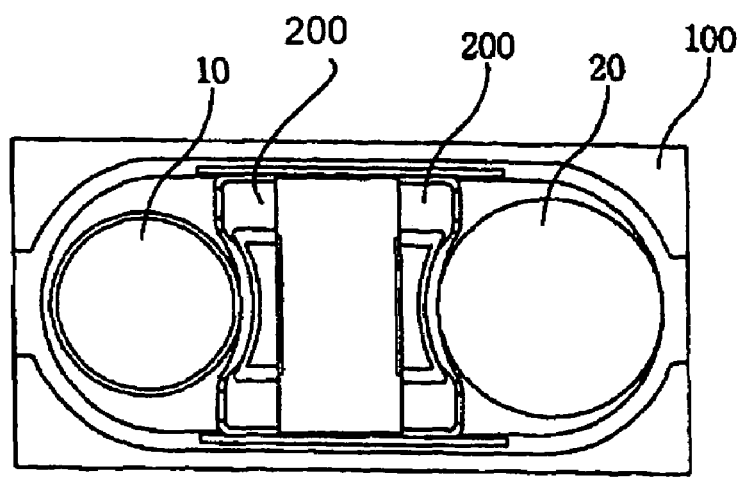

With reference to FIGS. 4a and 4b, the beverage container holder according to the present invention provides a structure which can firmly support both a container having a small diameter 10 and a container having a large diameter 20. Accordingly, the beverage container holder may be provided with as many slidable beverage container supporters 200 as is practical to hold more than one container.

As apparent from the foregoing, there is an advantage in that the beverage container holder according to the present invention comprises a housing for accommodating a beverage container of various sizes, such as a cup or a can. A slidable beverage container supporter 200 may be randomly disposed in the housing for sliding therein, thereby allowing a beverage container of any size to be fastened inside the housing 100 by adjusting the location of the beverage container supporter.

There is another advantage in that the slidable beverage container supporter 200 can be completely separated from the housing, resulting in a conversion of the cup holder by using it without the beverage container supporter, and a facilitation of cleaning the beverage container holder.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A beverage container holder for a vehicle, comprising:
   a housing defining a space for storing a beverage container, said housing further defining a horizontal direction;
   at least one slidable beverage container supporter having a first end and a second end for securing said beverage container in said housing;
   guiding means for guiding said slidable beverage container supporter to move within said housing; and
   fixing means for fixing said slidable beverage container supporter in a desired place with respect to said housing;

wherein said guiding means includes:
- at least one guiding rail formed inside said housing substantially along the horizontal direction, said at least one guiding rail defining a central portion therebetween; and
- at least one protruding part formed at each of said first and second ends of said slidable beverage container supporter, said at least one protruding part being insertable in said at least one guide rail for movement of said slidable beverage container supporter along said guiding rail;

wherein said fixing means includes:
- a plurality of fixing holes formed in said housing along a longitudinal direction of the central portion of said guiding rail;
- at least one push knob operably associated with said slidable beverage container supporter, the at least one push knob having a first position relative to said supporter;
- a first locking member operably associated with said slidable beverage container supporter, said first locking member having a motion in a direction into or released from said fixing holes in response to the operation of said push knob;
- a second locking member interacting with said first locking member and operably associated with said slidable beverage container supporter, the second locking member having a motion in a direction into or released from said fixing holes; and
- a power transmitting means for transmitting the motion of said first locking member to said second locking member.

2. The holder as defined in claim 1, wherein said power transmitting means includes a rotating gear that meshes with at least a portion of said first and second locking members for moving said second locking member such that the direction of motion of the second locking member is opposite the direction of motion of the first locking member.

3. The holder as defined in claim 1, wherein said beverage container holder for a vehicle further comprises:
- a first resilient member for restoring said push knob to said first position; and
- a second resilient member for providing an elastic force to the first locking member to bias the first locking member into at least one of the plurality of fixing holes; and
- a third resilient member for providing an elastic force to the second locking member to bias the second locking member into at least one of the plurality of fixing holes.

4. A container holder comprising:
- an elongated housing having an interior defining a chamber for holding a container, said housing further including a plurality of holes substantially aligned in the direction of elongation;
- at least one guide rail along the interior of the housing, the at least one guide rail being located such that said plurality of holes are aligned along a central portion of said guide rail;
- at least one supporter for adjusting the size of the chamber, the at least one supporter having a first end and a second end, each of said first and second ends includes at least one resiliently biased member and at least one projection, said at least one projection being engaged with said guide rail for sliding engagement of said supporter relative to said housing; and
- wherein said at least one resiliently biased member has a first state such that the member is engaged with at least one of said plurality of holes to fix said supporter relative to said housing and a second state such that said member is disengaged from said plurality of holes for permitting sliding movement of said supporter relative to said housing.

5. The container holder of claim 4, wherein at least a portion of each of said resiliently biased members is gear threaded, and wherein the holder further comprises a gear engaged with said gear threaded portions of said members for translating movement of one resiliently biased member to the other resiliently biased member.

6. The container holder of claim 4, further comprising a knob operably associated with at least one of the resiliently biased members of the supporter for moving the engaged at least one member between the first and second state.

* * * * *